(12) United States Patent
Kim et al.

(10) Patent No.: US 12,023,805 B2
(45) Date of Patent: Jul. 2, 2024

(54) SMALL ACTUATOR FOR ROBOT

(71) Applicant: ROBOTIS, INC., Lake Forest, CA (US)

(72) Inventors: Byoung Soo Kim, Seoul (KR); Wook Jang, Gwangmyeong-si (KR); Ung Kwon Yun, Seoul (KR)

(73) Assignee: ROBOTIS, INC., Lake Forest, CA (US)

( * ) Notice: Subject to any disclaimer, the term of this patent is extended or adjusted under 35 U.S.C. 154(b) by 0 days.

(21) Appl. No.: 17/924,673

(22) PCT Filed: May 20, 2021

(86) PCT No.: PCT/US2021/033279
§ 371 (c)(1),
(2) Date: Nov. 10, 2022

(87) PCT Pub. No.: WO2021/236858
PCT Pub. Date: Nov. 25, 2021

(65) Prior Publication Data
US 2023/0173664 A1 Jun. 8, 2023

(30) Foreign Application Priority Data
May 20, 2020 (KR) .................. 10-2020-0060253

(51) Int. Cl.
*B25J 9/12* (2006.01)
*B25J 9/10* (2006.01)

(52) U.S. Cl.
CPC ..... *B25J 9/12* (2013.01); *B25J 9/102* (2013.01)

(58) Field of Classification Search
CPC ............... B25J 9/12; B25J 9/102; B25J 9/10

USPC ....................................................... 74/89.16
See application file for complete search history.

(56) References Cited

U.S. PATENT DOCUMENTS

2006/0028164 A1 * 2/2006 Kono .................. B25J 9/08
318/625

FOREIGN PATENT DOCUMENTS

| CN | 108808976 A | * | 11/2018 | |
| CN | 208034713 U | | 11/2018 | |
| EP | 1616607 A1 | | 1/2006 | |
| EP | 1938877 A1 | * | 7/2008 | ............. A63H 11/18 |

OTHER PUBLICATIONS

International Search Report and Written Opinion of the International Search Authority for PCT/US2021/033279 mailed Aug. 23, 2021.

* cited by examiner

*Primary Examiner* — T. Scott Fix
(74) *Attorney, Agent, or Firm* — Revolution IP, PLLC

(57) ABSTRACT

Disclosed is a small actuator for a robot, including an intermediate case including a driving motor and a plurality of reduction gears, a front case having a through-hole, a housing coupled to the intermediate case and including a rear case having at least one tapping hole, a rotation part that has a tapping hole, is connected to the protruding final reduction gear, and is rotated at a final reduction ratio, a first tapping screw that passes through the tapping hole of the rotation part and is fastened to a rotary shaft of the protruding reduction gear, and at least one second tapping screw that passes through one side of the front case and the intermediate case and is fastened to the tapping hole of the rear case.

11 Claims, 6 Drawing Sheets

SMALL ACTUATOR FOR ROBOT

CROSS-REFERENCE TO RELATED APPLICATION

This application claims priority to Korean Patent Application No. 10-2020-0060253 filed on May 20, 2020, the disclosure of which is incorporated herein by reference in its entirety.

FIELD

The present disclosure relates to a small actuator for a robot, and more particularly, to a small actuator for a robot that may reduce power loss in a power transmission process of a driving motor and may be miniaturized and lightened.

BACKGROUND

Robots are used for various purposes in the range of industrial robots to humanoid robots and perform various joint movements using actuators that provide power.

With the rapidly developing robotics technology, the scope of use of robots, which previously have been used for only industrial purposes, has been expanded to other fields, and due to the recent fusion of the robot technology and the artificial intelligence technology, the scope of use of robots is being expanded not only in the industrial fields but also for home use and education.

Key modules for driving robots are actuators that provide power to joints. The actuators cause linear and rotational movements of robot joints through various power transmission members such as gears. In the robots, since the joints are moved using torques of motors provided in the actuators, reducers are required to increase forces generated by the motors to forces enough to move the joints. Gear-type reducers, electric ball-type reducers, and cycloid reducers are used as the reducers.

The actuators may be manufactured in various sizes according to application targets and need to be installed at desired positions through mechanical connection and assembly according to the structures of the robots.

SUMMARY

The present disclosure is directed to providing a small actuator for a robot that may generate a torque required to operate a robot arm from rotation of a small motor using reduction gears within a narrow housing space. The present disclosure is also directed to providing a small actuator for a robot that may be miniaturized and lightened.

The present disclosure is also directed to providing a small actuator for a robot that may generate various reduction ratios according to an application target, a robot structure, and the like.

A small actuator for a robot according to the present disclosure includes an intermediate case including a driving motor and a plurality of reduction gears that continuously decelerate rotation of the driving motor to increase a torque, a front case having a through-hole, wherein a part of a final reduction gear among the reduction gears passes through the through-hole to protrude to the outside, a housing coupled to the intermediate case and including a rear case having at least one tapping hole formed in corner regions thereof, a rotation part that has a tapping hole, is connected to the protruding final reduction gear by inserting the protruding final reduction gear into an inner space surrounded by a circular guide wall formed on a rear surface of the rotation part, and is rotated at a final reduction ratio, a first tapping screw that passes through the tapping hole of the rotation part and is fastened to a rotary shaft of the protruding reduction gear, and at least one second tapping screw that passes through one side of the front case and the intermediate case and is fastened to the tapping hole of the rear case.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, the present disclosure will be described with reference to the accompanying drawings. However, the present disclosure may be implemented in various different forms and is not limited to the embodiments described herein. Further, in the drawings, parts irrelevant to the description are omitted in order to clearly describe the present disclosure, and throughout the specification, the similar numerals reference numerals are assigned to the similar parts.

Throughout the specification, when a first part is "connected to (access to, in contact with, and coupled to)" a second part, this includes not only a case in which the first part is "directly connected to the second part but also a case in which the first part is indirectly connected to the second part with a third part interposed therebetween. Further, when a part "includes" a component, this means that another component is not excluded but may be further included unless otherwise stated.

Terms used herein are used only to describe specific embodiments and are not intended to limit the present disclosure. Singular expressions include plural expressions unless clearly otherwise indicated in the context. It should be understood in the present specification that terms such as "include" or "have" are intended to indicate that there are features, numbers, steps, operations, components, parts, or combinations thereof that are described in the specification and do not exclude, in advance, the possibility of the presence or addition of one or more other features, numbers, steps, operations, components, parts, or combinations thereof.

Hereinafter, a small actuator for a robot according to the present disclosure will be described in detail with reference to the accompanying drawings.

Figure 1:
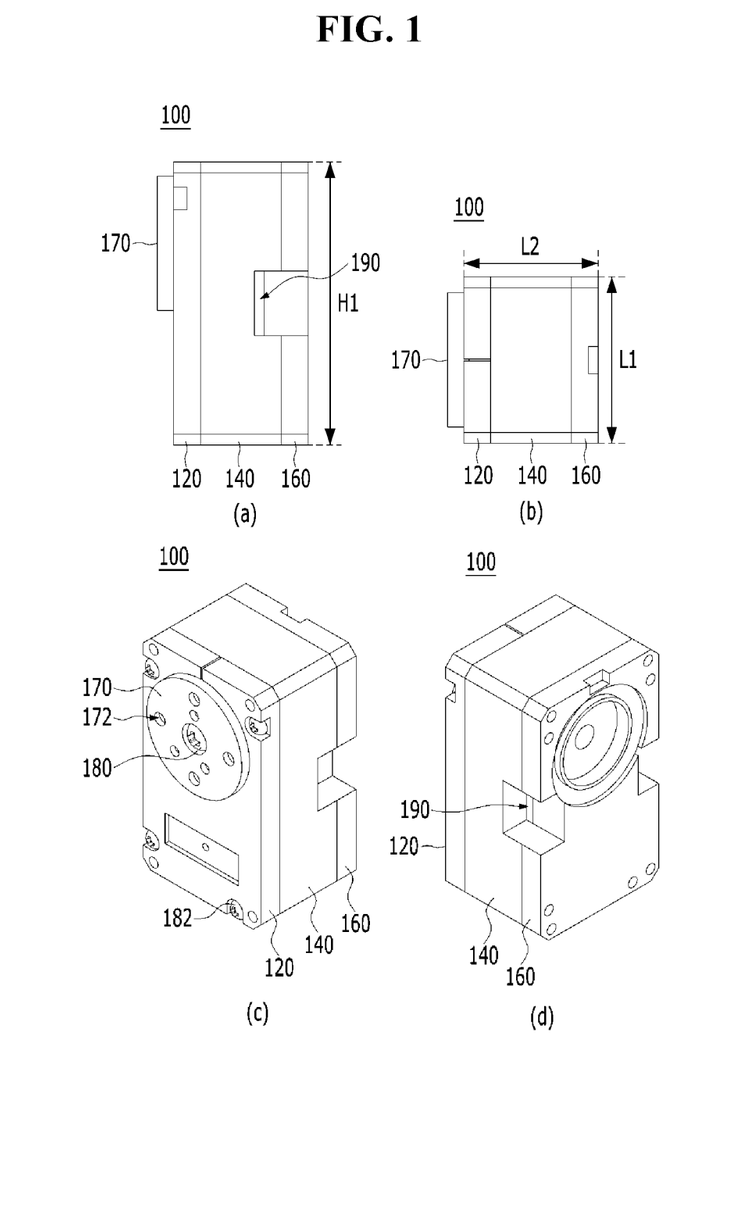
FIG. 1 shows views illustrating a small actuator according to an embodiment of the present disclosure.

FIG. 1 shows views illustrating a small actuator according to an embodiment of the present disclosure.

FIG. 1A is a right side view of the actuator 100, and FIG. 1B is a plan view of the actuator 100. Further, FIG. 1C is a perspective view illustrating a front surface of the actuator 100, and FIG. 1D is a perspective view illustrating a rear surface of the actuator 100.

As illustrated, a housing of the actuator 100 includes a front case 120, an intermediate case 140, and a rear case 160.

A rotation part 170 operated by a torque transferred from the inside of the housing is connected to the outside of the front case 120.

Although not illustrated, a driving motor and a plurality of reduction gears for increasing the torque by continuously decelerating rotation of the driving motor are mounted inside the intermediate case 140. Finally, some of the reduction gears are exposed to the outside through the front case 120, and the exposed part is connected to the rotation part 170.

The rotation part 170 is a module that finally receives the torque generated inside the actuator 100 and transfers the torque to another external robot module. The rotation part 170 is connected to a final reduction gear through a first tapping screw 180 that passes through the center of the rotation part 170 and is fastened to a rotary shaft of the final reduction gear, which is a final output shaft. Thus, the rotation part 170 is rotated at the same speed as the final reduction gear.

The rear case 160 is fastened to second tapping screws 182 inserted through the front case 120 and the intermediate case 140 through connection holes (not illustrated) provided in four corners of the front case 120. That is, the front case 120, the intermediate case 140, and the rear case 160 are coupled by the second tapping screws 182.

In this way, by applying a tapping structure in which the tapping screws 180 and 182 are used to assemble the actuator housing, the weight of the actuator 100 may be reduced as compared to a case in which a flange structure, in which nuts are additionally required, is applied.

The driving motor, which is a first power source, continuously generates heat due to rotation, and a plurality of reduction gears provided between the front case 120 and the intermediate case 140 are rotated while being engaged with each other, thereby generating heat due to friction. Thus, the front case 120 and the intermediate case 140 may be made of aluminum having high thermal conductivity and high heat radiation.

Meanwhile, an open area 190 is provided between the intermediate case 140 and the rear case 160 coupled to each other, the heat of the driving motor may be directly discharged through the open area 190, and thus the rear case 160 may be manufactured of an engineering plastic to reduce the weight of a product. The engineering plastic is a material having high mechanical strength, high heat resistance, and high abrasion resistance and is advantageous for reducing the weight of the product. The engineering plastic includes polycarbonate (PC), polyacetal, polyphenyleneoxide (PRO), polyethylene terephthalate (PET), or polybutylene terephthalate (PBT).

Here, the materials of the presented cases 120, 140, and 160 are merely one example, and the cases may be made of different types of materials or may be made of the same material.

The open area 190 between the intermediate case 140 and the rear case 160 is used as a space for connecting terminals of the driving motor and electric wires for transmitting/receiving power and control signals in addition to radiation of internal heat.

Since the small actuator 100 is applied to a small device such as a small robot, the small actuator 100 should have the smallest size so as to occupy less space. However, since the driving motor and the reduction gears for increasing the torque by decelerating the rotation of the driving motor should be mounted therein, the three-dimensional size is determined in consideration of the driving motor and the reduction gears.

It is preferable that the small actuator 100 according to the embodiment of the present disclosure is manufactured to have a width L1 of 15 to 20 mm, a length L2 of 20 to 25 mm, and a height H1 of 30 to 35 mm in consideration of the radii and arrangement of the driving motor and the reduction gears. This numerical range is obtained in consideration of the radius of the reduction gears mounted inside the actuator housing and the inter-axis distance between rotary shafts of the reduction gears.

In the embodiment of the present disclosure, the actuator housing may be manufactured to have a width L1 of 20 mm, a length L2 of 23 mm, and a height H1 of 34 mm.

Meanwhile, since the actuator 100 is a module having a three-dimensional structure including a width, a length, and a height, when the volume increases or the area imbalance between surfaces of the housing increases, the assembling property with another module may be degraded.

For example, as the ratios between the three factors, such as width/length, width/height, and length/height, decrease, the area imbalance between six surfaces of the housing decreases, but the volume increases, and as the ratios between the three factors increase, the volume of the housing decreases, but the area imbalance between the six surfaces increases. Thus, in order to reduce the volume of the housing and, at the same time, reduce the area imbalance, the ratios between the three factors such as the width, the length, and the height should be set efficiently.

In the embodiment of the present disclosure, as a ratio of the longest value/the shortest value among the width, the length, and the height of the actuator housing is set in the range of 1.5 to 2.5, the area imbalance between the surfaces is reduced while the volume of the housing is reduced, and thus the assembling property with another module can be improved.

The numerical ranges of the width, the length, and the height of the actuator housing and the ratio ranges therebetween are presented above, but this is merely one example, and the present disclosure is not limited thereto.

Figure 2:
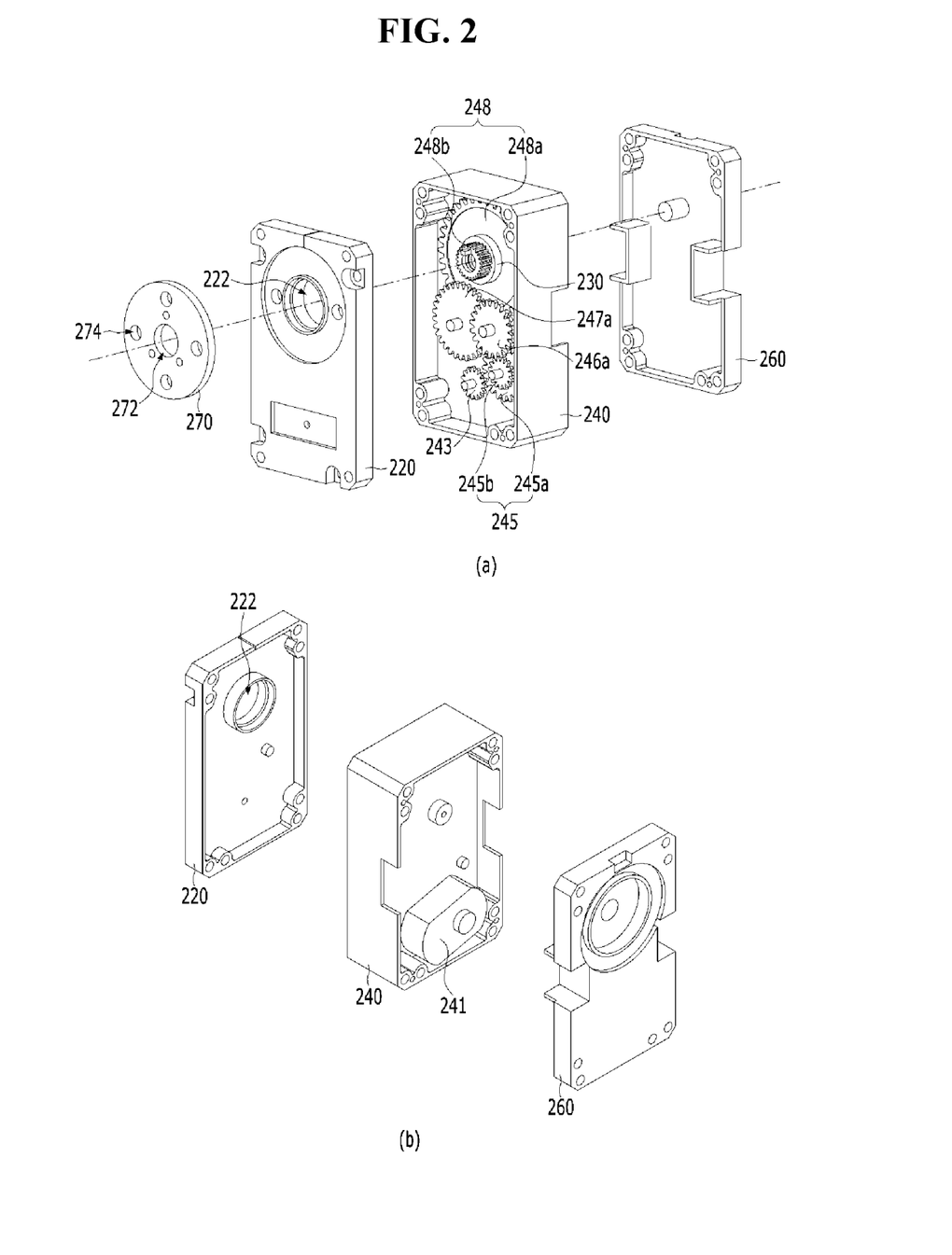
FIG. 2 shows exploded perspective views illustrating the actuator according to the embodiment of the present disclosure.

FIG. 2 shows exploded perspective views of the actuator according to the embodiment of the present disclosure.

FIG. 2A is a front perspective view illustrating a coupling relationship between the front, intermediate, and rear cases 220, 240, and 260, and FIG. 2B is a rear perspective view illustrating the coupling relationship between the front, intermediate, and rear cases 220, 240, and 260.

In the drawing, a through-hole 222 is provided in the front case 220, and a driving motor 241 and first to fourth reduction gears 245 to 248 are mounted in the intermediate case 240.

A tapping hole 272 and connection holes 274 are formed in a rotation part 270. The tapping hole 272 is a space into which a first tapping screw is inserted and fastened, and the connection hole 274 is a portion to be coupled to another module of the robot to transmit a torque of the rotation part 270 to the another module.

The driving motor 241 serving as a power source and the plurality of reduction gears 245 to 248 are mounted in the intermediate case 240. When the driving motor 241 mounted on one inner side of the intermediate case 240 rotates, a driven gear 245a of the first reduction gear 245 engaged with a fixed gear 243 fixed to a rotary shaft of the driving motor 241 rotates in a direction opposite to the rotation of the driving motor 241, and the driving gear 245b integrated with the driven gear 245a rotates together. A driven gear 246a of the second reduction gear 246 is engaged with the driving gear 245b of the first reduction gear 245 and rotates in the direction opposite to the rotation of the first reduction gear 245, and a driving gear (not illustrated) integrated with the driven gear 246a rotates together. In this manner, the power of the driving motor 241 is transferred to the fourth reduction gear 248 via the third reduction gear 247.

The reason for connecting the reduction gears 245 to 248 to the driving motor 241 of the actuator 100 is to obtain a sufficient torque to drive robot arms by decelerating the rotational speed of the small driving motor 241.

When the intermediate case 240, in which the driving motor 241 and the reduction gears 245 to 248 are mounted, and the front case 220 are coupled to each other, the fourth reduction gear 248 passes through the through-hole 222 of the front case 220 and protrudes to the outside. The protruding fourth reduction gear 248 is connected to the rotation part 270 to transmit a torque increased at a constant reduction gear ratio.

Meanwhile, a bearing 230 made of plastic is inserted into a rotary shaft of the fourth reduction gear 248, and when the front case 220 and the intermediate case 240 are coupled to each other, the through-hole 222 of the front case 220 and the fourth reduction gear 248 are in close contact with each other. Accordingly, when the fourth reduction gear 248 rotates, the bearing 230 reduces friction so that the fourth reduction gear 248 rotates smoothly.

Figure 3:
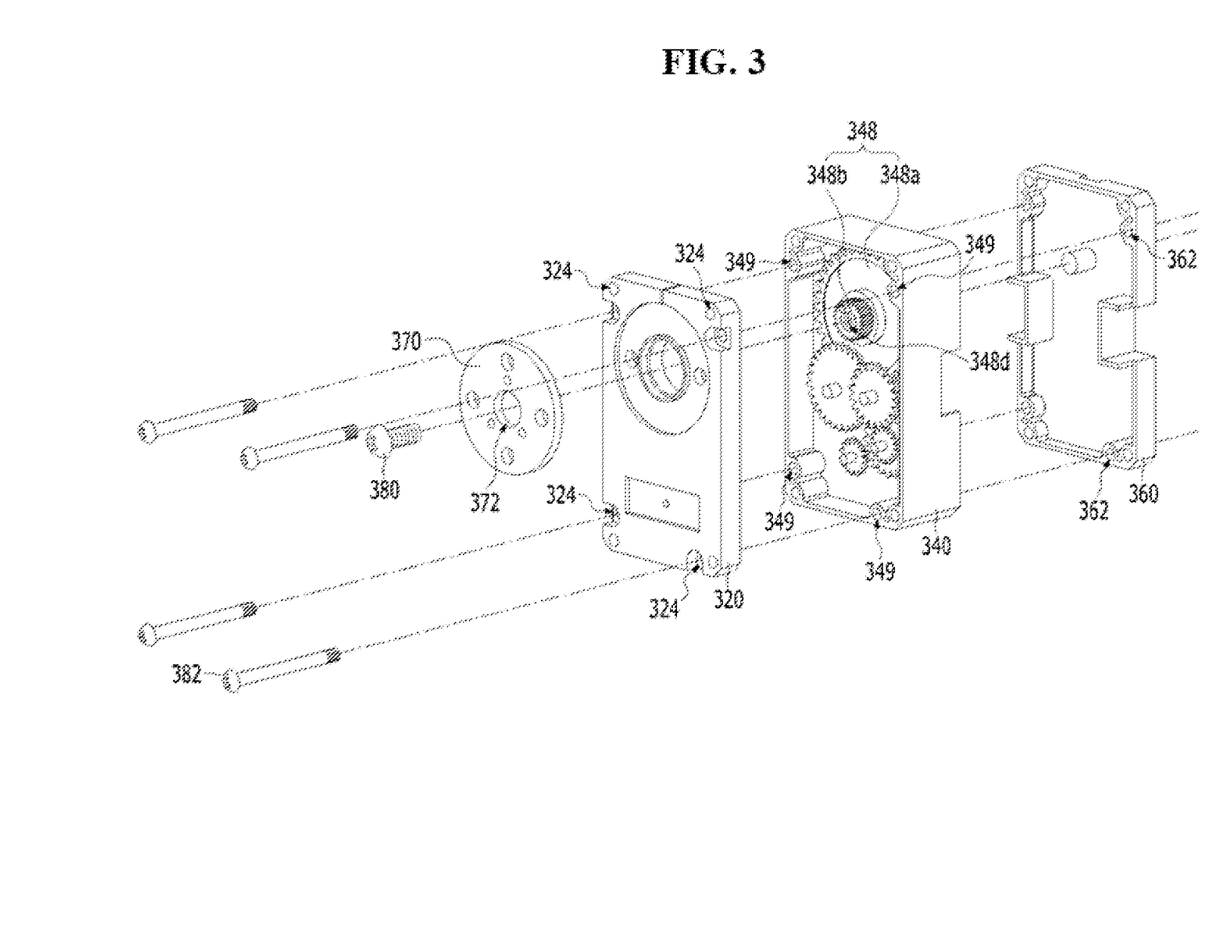
FIG. 3 is an exploded perspective view illustrating a fastening relationship between cases of the actuator according to the embodiment of the present disclosure.

FIG. 3 is an exploded perspective view of a fastening relationship between cases of the actuator according to the embodiment of the present disclosure.

In FIG. 3, the duplicated description of FIG. 2 will be omitted.

As illustrated, when a front case 320 and an intermediate case 340 are coupled, a fourth reduction gear 348 mounted in the intermediate case 240 passes through a through-hole of the front case 320 to protrude outward, and the outward protrusion part of the fourth reduction gear 248 is connected to a rotation part 370. Here, a first tapping screw 380 passes through a tapping hole 372 of the rotation part 370 and is fastened to a tapping hole 348d of the fourth reduction gear 348, and thus the fourth reduction gear 348 and the rotation part 370 are connected. Accordingly, the torque increased by first to fourth reduction gears is transferred to the rotation part 370.

Meanwhile, a connection hole 324 is formed in each of four corner regions of the front case 320, and a connection hole 349 is formed in each of four corner regions of the intermediate case 340. A second tapping screw 382 passes through the front case 320 and the intermediate case 340 through the connection holes 324 and 349 and is fastened to a tapping hole 362 formed in a rear case 360. That is, the front case 320, the intermediate case 340, and the rear case 360 are coupled by the second tapping screws 382 to constitute the actuator housing.

Figure 4:
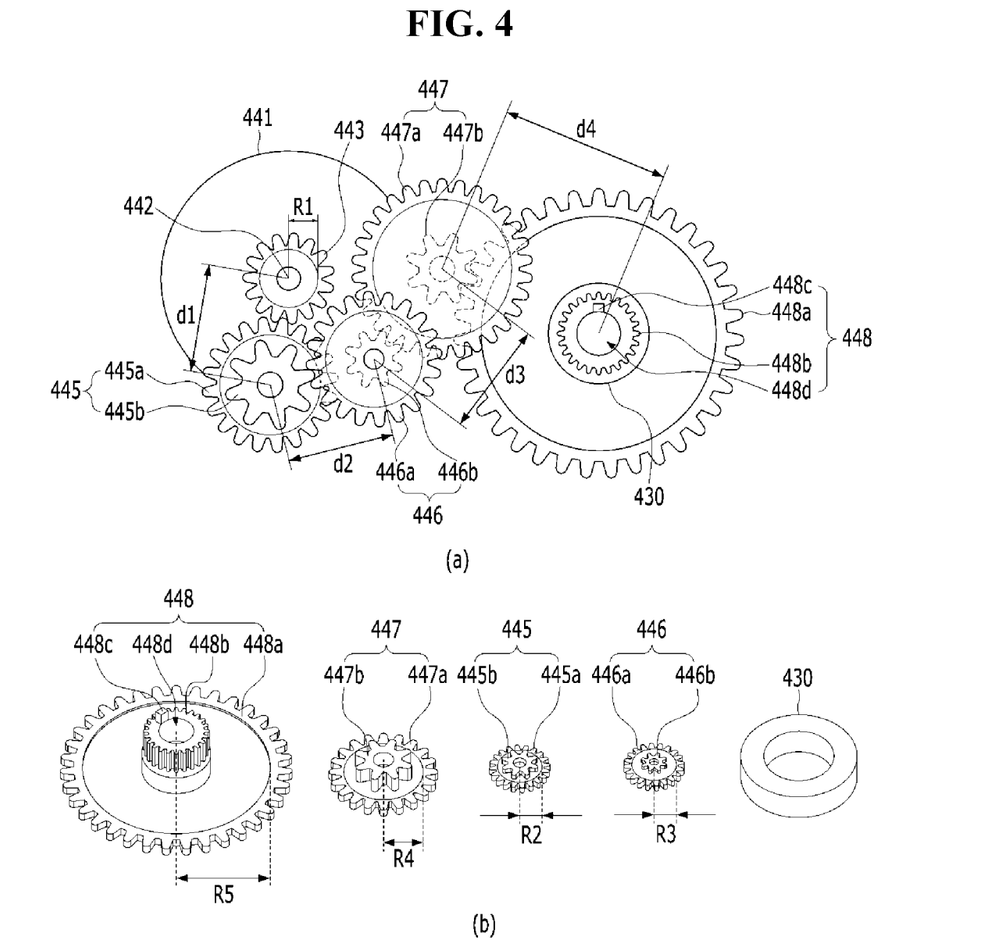
FIG. 4 shows views illustrating an engagement relationship between reduction gears of the actuator and the reduction gears according to the embodiment of the present disclosure.

FIG. 4 shows views illustrating an engagement relationship between reduction gears of the actuator and the reduction gears according to the embodiment of the present disclosure.

FIG. 4A is a view illustrating an engagement relationship between reduction gears for obtaining a desired torque by decelerating the rotation of the driving motor at a constant reduction ratio, and FIG. 4B is a view illustrating respective reduction gears.

As illustrated, a fixed gear 443 is connected to a rotary shaft 442 of the driving motor 441 that provides power to the actuator 100. The fixed gear 443 is engaged with a first reduction gear 445, and the first reduction gear 445 is engaged with a second reduction gear 446. Further, the second reduction gear 446 is engaged with a third reduction gear 447, and the third reduction gear 447 is engaged with a fourth reduction gear 448 that is a final reduction gear. Each of the first to fourth reduction gears 445 to 448 is a dual gear in which a driving gear that transmits power and a driven gear that receives power are integrated into one set. This is a configuration for efficiently increasing a torque within a narrow space of the small actuator.

The driving gear and the driven gear constituting the first to fourth reduction gears 445 to 448 may be configured as spur gears, but the present disclosure is not limited thereto.

The fourth reduction gear 448 has a rotation part connected through the front case and two structures for synchronizing rotation between the two components. First, a fourth driving gear 448b of the fourth reduction gear 448 is engaged with gears formed in the rotation part, and thus the rotation between the two components is synchronized. Further, a fixing protrusion 448c that is inserted into a hole structure in the rotation part to synchronize the rotation of the fourth reduction gear 448 and the rotation part is formed on one side of a rotary shaft of the fourth driving gear 448b. Further, a tapping hole 488d for being fastened with the rotation part is formed in the rotary shaft of the fourth driving gear 448b.

The detailed structure of the rotation part will be described below in detail with reference to FIG. 6.

Meanwhile, a bearing 430 for reducing rotational friction is inserted through the rotary shaft of the fourth driving gear 448b.

As illustrated in FIG. 1, it is preferable that the actuator housing of the present disclosure including the front case, the intermediate case, and the rear case is manufactured to have a width of 15 to 20 mm, a length of 20 to 25 mm, and a height of 30 to 35 mm. In this way, in order to mount the driving motor and the plurality of reduction gears in a small housing, the distance between rotary shafts of the reduction gears should be decreased and the radius of each of the reduction gears should be reduced.

Five rotary shafts are formed in the actuator housing according to the embodiment of the present disclosure. One rotary shaft is the rotary shaft 442 of the driving motor, and the other four rotary shafts are the rotary shafts of the reduction gears 445 to 448. The inter-axis distance between the rotary shafts is determined in consideration of the radii of the first to fourth reduction gears 445 to 448.

The first to fourth reduction gears 445 to 448 are dual gears integrally having both a driven gear and a driving gear. In order to increase a reduction ratio, in a dual gear structure, the radius of the driven gear is larger than that of the driving gear. Thus, the radius of each driven gear is the radius of the reduction gears 445 to 448.

It is preferable that a radius $R2$ of the first reduction gear 445 is greater than or equal to a radius $R1$ of the fixed gear of the driving motor 441 and that a radius R3 of the second reduction gear 446 is equal to or larger than the radius R2 of the first reduction gear 445. Further, it is preferable that a radius R4 of the third reduction gear 447 is equal to or larger than the radius R3 of the second reduction gear 446 and that a radius R5 of the fourth reduction gear 448 is equal to or larger than the radius R4 of the third reduction gear 447.

Using this configuration, a constant reduction ratio can be obtained between the rotary shaft 442 of the driving motor 441 and the rotary shaft of the fourth reduction gear 448 that is a final output shaft.

In the embodiment of the present disclosure, by applying the above-described radius relationship between the reduction gears 445 to 448, the radius R1 of the fixed gear 443 of the driving motor 441 may be manufactured as 1 mm, and the radii R2 and R3 of the first reduction gear 445 and the second reduction gear 446 may be manufactured as 3 mm. Further, the radius R4 of the third reduction gear 447 may be manufactured as 4.5 mm, and the radius R5 of the fourth reduction gear 448 may be manufactured as 7 mm. Of course, this is merely one example, and the present disclosure is not limited to these numerical values.

Meanwhile, the inter-axis distance between the rotary shafts should be set in consideration of the radius of the fixed gear 443 and the radii of the first to fourth reduction gears 445 to 448. Since it is preferable that the radii of the gears 443 and 445 to 448 are formed to be equal to or larger than the radius of a previous gear to be engaged, it is preferable that the inter-axis distance also reflects this fact, and thus a $(N+1)^{th}$ inter-axis distance is formed to be equal to or larger than a $N^{th}$ inter-axis distance.

For example, a second inter-axis distance d2 between the rotary shafts of the first and second reduction gears 445 and 446 is formed to be equal to or larger than a first inter-axis distance d1 between the rotary shaft 442 of the driving motor 441 and the rotary shaft of the first reduction gear 445. Further, it is preferable that a third inter-axis distance d3 between the rotary shafts of the second and third reduction gears 446 and 447 is formed to be equal to or larger than a second inter-axis distance d2. Further, it is preferable that a fourth inter-axis distance d4 between the rotary shafts of the third and fourth reduction gears 447 and 448 is formed to be equal to or larger than the third inter-axis distance d3.

In the embodiment of the present disclosure, a distance d1 between the rotary shaft 442 of the driving motor 441 and the rotary shaft of the first reduction gear 445 may be set to 5 mm, and a distance d2 between the rotary shaft of the first reduction gear 445 and the rotary shaft of the second reduction gear 446 may be set to 6.5 mm. Further, a distance d3 between the rotary shaft of the second reduction gear 446 and the rotary shaft of the third reduction gear 447 may be set to 6.5 mm, and a distance d4 between the rotary shaft of the third reduction gear 447 and the rotary shaft of the fourth reduction gear 448 may be set to 9.7 mm. These numerical values are merely one example that may be applied to the actuator of the present disclosure, and thus the present disclosure is not limited thereto.

The operations between the driving motor 441 and the reduction gears 445 to 448 configured above will be described below in detail.

The fixed gear 443 is coupled to the rotary shaft 442 of the driving motor 441, and when the rotary shaft 442 rotates, a first driven gear 445a of the first reduction gear 445 engaged with the fixed gear 443 rotates in a direction opposite to the rotation of the fixed gear 443. In this case, a first driving gear 445b integrated with the first driven gear 445a rotates simultaneously.

Since the tooth sizes of the two gears engaged with each other are the same, the reduction ratio between the two gears may be obtained from the radius ratio of the two gears or the ratio of the number of teeth of the two gears. It is preferable that a first reduction ratio, which is a ratio of the radius R1 of the first driven gear 445a of the first reduction gear 445 and the radius of the fixed gear 443, is set in the range of 2.5 to 3.5. The first driven gear 445a is engaged with the fixed gear 443 and rotates with a torque increased by the first reduction ratio.

When the first driving gear 445b integrated with the first driven gear 445a rotates, a second driven gear 446a of the second reduction gear 446 engaged with the first driving gear 445b also rotates. In this case, it is preferable that a second reduction ratio, which is a ratio of the radius R2 of the second driven gear 446a of the second reduction gear 446 and the radius of the first driving gear 445b of the first reduction gear 445, is set in the range of 1 to 2. The second driven gear 446a is engaged with the first driving gear 445b and rotates with a torque increased by the second reduction ratio.

Next, when a second driving gear 446b integrated with the second driven gear 446a rotates, a third driven gear 447a of the third reduction gear 447 engaged with the second driving gear 446b also rotates. In this case, it is preferable that a third reduction ratio, which is a ratio of the radius R3 of the third driven gear 447a of the third reduction gear 447 and the radius of the second driving gear 446b of the second reduction gear 446, is set in the range of 3.5 to 4.5. The third driven gear 447a is engaged with the second driving gear 446b and rotates with a torque increased by the third reduction ratio.

Finally, when a third driving gear 447b integrated with the third driven gear 447a rotates, a fourth driven gear 448a of the fourth reduction gear 448 engaged with the third driving gear 447b also rotates. In this case, it is preferable that a fourth reduction ratio, which is a ratio of the radius R4 of the fourth driven gear 448a of the fourth reduction gear 448 and the radius of the third driving gear 447b of the third reduction gear 447, is set in the range of 4 to 5. The fourth driven gear 448a is engaged with the third driving gear 447b and rotates with a torque increased by the fourth reduction ratio. The fourth reduction gear 448 is a final reduction gear, and the rotary shaft thereof is a final output shaft. The torque according to the final reduction ratio is transmitted to the rotation part (not illustrated) through the same rotary shaft.

Total reduction ratio=first reduction ratio×second reduction ratio×third reduction ratio×fourth reduction ratio [Equation 1]

Referring to the embodiment of the present disclosure illustrated in FIG. 4, the total reduction ratio, which may be obtained using the four reduction gears 445 to 448 between the rotary shaft 442 of the driving motor 441 and the rotary shaft of the fourth reduction gear 448 that is the final reduction gear, may be obtained by multiplying all of the first to fourth reduction ratios, as represented by Equation 1.

However, when the reduction ratio is increased too much, the torque increases, but a reaction speed decreases, and thus immediate posture control may become difficult, and when the reduction ratio is decreased too much, a driving motor having a large torque should be used from the beginning, the size of the driving motor increases, and thus the miniaturization of the housing may be hindered. Thus, in the embodiment of the present disclosure, it is preferable that the total reduction ratio is set in the range of 50 to 150 by adjusting the first to fourth reduction ratios.

Meanwhile, among the four reduction gears 445 to 448, the remaining three gears except for the fourth reduction gear 448 fastened to the rotation part through the front case may be replaced to obtain a stronger torque. By setting the difference between the number of teeth of the driving gear and the number of teeth of the driven gear of each of the three reduction gears 445 to 447 to be larger, the reduction ratio of the engaged driving gear and the engaged driven gear may be made smaller. For example, the reduction ratio reduced by 80/290 as compared to a case before the three reduction gears 445 to 447 are replaced may be obtained. Of course, the reduction ratio is not limited to the numerical value, and various reduction ratios may be applied.

Figure 5:
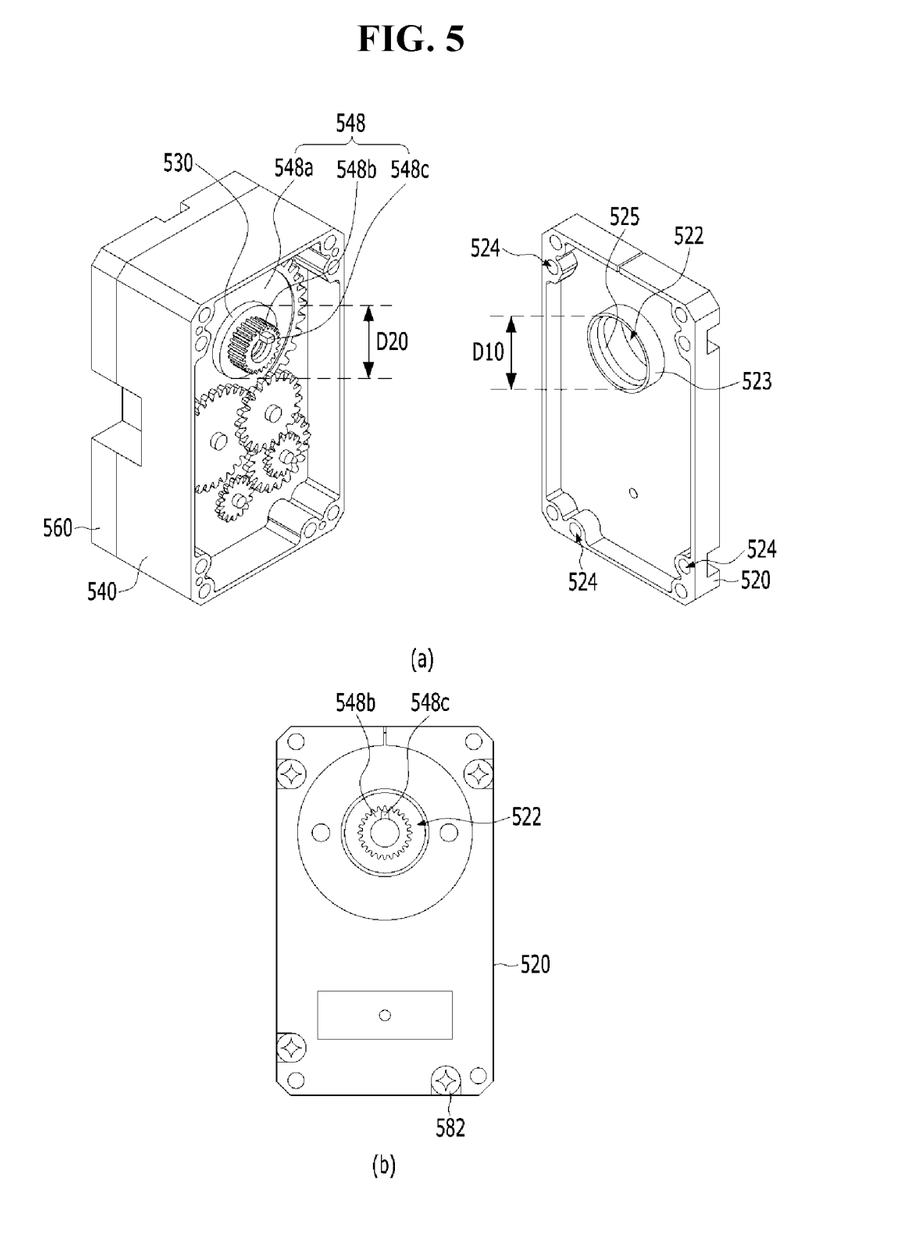
FIG. 5 shows views illustrating a fastening relationship between a front case and an intermediate case of the actuator according to the embodiment of the present disclosure.

FIG. 5 shows views illustrating a fastening relationship between a front case and an intermediate case of the actuator according to the embodiment of the present disclosure.

FIG. 5A is a view illustrating a case before the front case and the intermediate case are fastened, and FIG. 5B is a view illustrating a case after the front case and the intermediate case are fastened.

As illustrated in FIG. 5A, connection holes 524 through which second tapping screws are inserted are formed at four corner regions of a front case 520, and a through-hole 522 that is a passage for connecting a fourth driving gear 548b of a fourth reduction gear 548 and a rotation part is formed. A locking step 525 is formed around the inner perimeter of the through-hole 522.

Reduction gears manufactured in the form of a dual gear are mounted in an intermediate case 540, and a bearing 530 is inserted through a rotary shaft of a fourth reduction gear among the reduction gears. When the front case 520 and the intermediate case 540 are assembled, the bearing 530 is inserted into and in close contact with the through-hole 522. More precisely, the bearing 530 is in close contact between the fourth reduction gear and the locking step 525 formed along the inner perimeter of the through-hole 522. Thus, the position of the rotary shaft of the fourth reduction gear is fixed, and smooth rotation is performed by the bearing 530. In this case, it is preferable that the diameter D20 of the bearing 530 and the diameter D10 of the inner perimeter of a guide wall 523 on the rear surface of the front case 520 are equally manufactured as 8 mm.

Referring to FIG. 5B, after the front case 520 and the intermediate case 540 are assembled, a fourth driving gear 548b of the fourth reduction gear is exposed through the through-hole 522 of the front case 520 to the outside. Since the bearing 530 is caught by the locking step 525 formed in the inner perimeter of the through-hole 522, only the fourth driving gear 448b in the fourth reduction gear 548 is exposed to the outside.

The front case 520 is assembled with the intermediate case and the rear case through second tapping screws 582 passing through four corner regions of the front case 520 and connected to the rear case.

Figure 6:
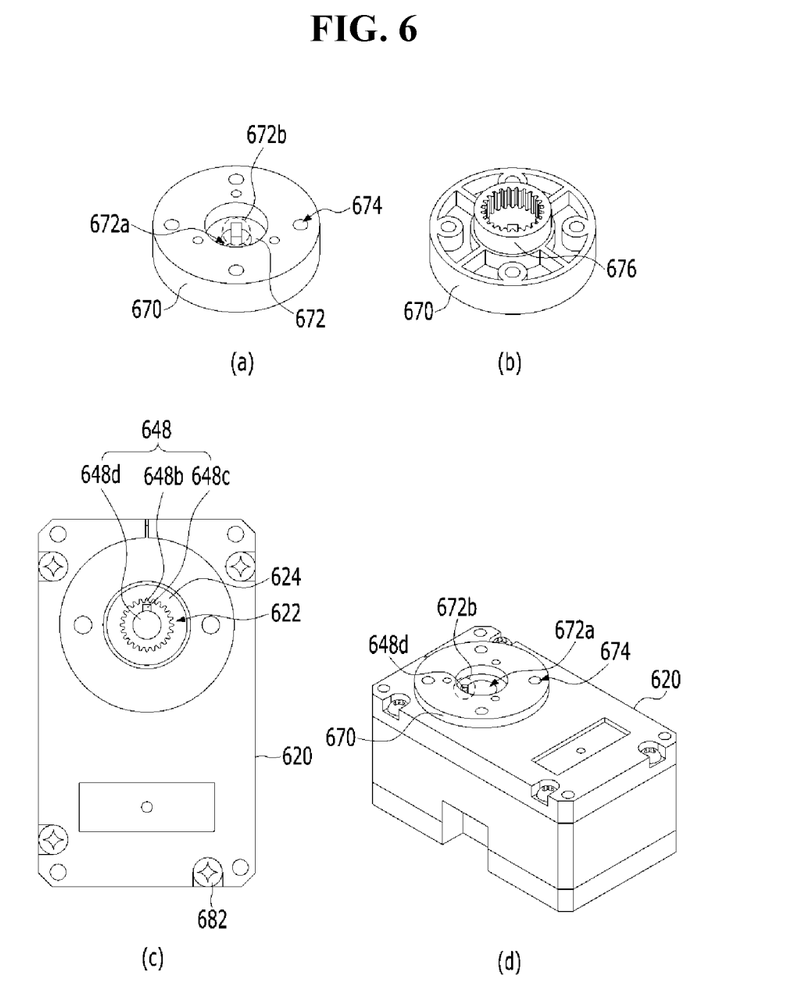
FIG. 6 shows views illustrating a fastening relationship between the front case and a rotation part according to the embodiment of the present disclosure.

FIG. 6 shows views illustrating a fastening relationship between the front case and a rotation part according to the embodiment of the present disclosure.

FIG. 6A is a view illustrating a front surface of a rotation part, and FIG. 6B is a view illustrating a rear surface of the rotation part. Further, FIG. 6C is a view illustrating a state in which, after the front case and the intermediate case are assembled, a final driving gear protrudes to the outside of the front case, and FIG. 6D is a view illustrating a state in which the inner driving gear protruding to the outside of the front case and the rotation part are connected.

First, referring to FIGS. 6A and 6B, a central groove 672 is formed in a rotation part 670, and a tapping hole 672a through which a first tapping screw is inserted and a fixing hole 672b extending to one side of the tapping hole 672a are provided in the center of the central groove 672. Further, a plurality of connection holes 674 are formed around the rotation part 670.

A circular guide wall 676 is formed on the rear surface of the rotation part 670, and an inner gear is formed in the inner perimeter of the guide wall 676.

The tapping hole 672a formed in the rotation part 670 has a structure for fastening a fourth reduction gear 648 and the rotation part 670 mounted in the intermediate case, and the inner gear of the fixing hole 672b and the guide wall 676 has a structure for synchronizing rotation of the rotation part 670 and the reduction gear protruding to the outside of a front case 620.

Meanwhile, the connection holes 674 have a structure provided to connect an actuator module of the present disclosure to another configuration module of the robot.

Referring to FIG. 6C, a fourth driving gear 648b of the fourth reduction gear 648 that is mounted in the intermediate case and is the final reduction gear is exposed to the outside through a through-hole 622 of the front case 620.

Referring to FIG. 6D, the fourth driving gear 648b protruding to the outside of the front case 620 and the rotation part 670 are connected.

Although not illustrated, a first tapping screw is fastened through the tapping hole 672a formed in the center of the rotation part 670 and a tapping hole 648d formed in a rotary shaft of the fourth reduction gear 648. Accordingly, the rotation part 670 is coupled to the actuator housing. Further, each second tapping screw 682 is fastened to a tapping hole of the rear case to pass through the front case 620 and four corner regions of the intermediate case. That is, the actuator housing including the front, intermediate, and rear cases is assembled only with the first tapping screw and the second tapping screws 682.

The circular guide wall 676 of the rotation part 670 is inserted between the protruding fourth driving gear 648b and the through-hole 622, and the gear formed in the inner perimeter of the guide wall 676 is engaged with the fourth driving gear 648b. Further, a fixing protrusion 648d formed on one side of the fourth driving gear 648b is inserted into the fixing hole 672b of the rotation part 670.

In this way, the rotation of the rotation part 670 and the fourth reduction gear 648 is synchronized through a dual structure in which the inner gear formed in the rear surface of the rotation part 670 and the fourth reduction gear 648 protruding from the front case 620 are engaged and the fixing protrusion 648d and the fixing hole 672b are coupled.

As the rotational speed of the fourth reduction gear 648 changes, when a state of engagement between the fourth reduction gear 648 and the rotation part 670 is shifted and thus the fourth reduction gear 648 and the rotation part 670 are idle, unnecessary power loss may occur. Thus, the rotation between the fourth reduction gear 648 and the rotation part 670 is synchronized through a dual fixing structure therebetween, and thus power loss that may occur in a rotation transmission process can be minimized.

As described above, in the small actuator according to the embodiment of the present disclosure, the plurality of reduction gears having a dual gear structure are applied. Thus, the actuator housing can be miniaturized, and an increase in the torque and a decrease in an operation reaction speed can be balanced through the appropriate range of the reduction ratios. Further, by replacing three reduction gears, various reduction ratios can be implemented according to an application target, a robot structure, and the like.

Further, by applying a self-tapping structure instead of a commonly used flange structure, the actuator housing including the front, intermediate, and rear cases is assembled with only the tapping screws. Accordingly, the product can be miniaturized by simplifying the structure and can be reduced in weight because nuts are not required.

Further, in the small actuator according to the embodiment of the present disclosure, since the internal reduction gear and the external rotation part are synchronized with each other by the dual structure, loss of power transmitted within the actuator can be reduced with high reliability.

According to the embodiment of the present disclosure, a torque required to operate a robot arm from the rotation of a small motor within a narrow housing space can be obtained by mounting reduction gears having a dual gear structure.

According to the embodiment of the present disclosure, a housing of an actuator including front, intermediate, and rear cases is assembled with only a plurality of tapping screws. Thus, as compared to a generally used flange structure, a structure is simplified, nuts are not required, and thus the actuator can be miniaturized and lightened.

According to the embodiment of the present disclosure, by adjusting the ratio of the width, the length, and the height of the actuator housing, the volume is efficiently reduced, and at the same time, the area imbalance between six surfaces of the housing is reduced. Thus, when a robot is manufactured, assembling properties with another module can be improved.

According to the embodiment of the present disclosure, by replacing the reduction gears inside the actuator, various reduction ratios can be obtained according to an application target, a robot structure, and the like.

According to the embodiment of the present disclosure, the reduction gear inside the actuator and an external rotation part fastened thereto are fixed in a dual structure to synchronize rotation between the two components, and thus power loss that can occur in a rotation transmission process can be reduced.

The effects of the present disclosure are not limited to the above effects and should be understood to include all effects that can be deduced from the detailed description of the present disclosure or the configuration of the present disclosure described in the appended claims.

The invention claimed is:

1. A small actuator for a robot, comprising:
   an intermediate case including a driving motor and a plurality of reduction gears that continuously decelerate rotation of the driving motor to increase a torque;
   a front case having a through-hole, wherein a part of a final reduction gear among the reduction gears passes through the through-hole;
   a housing coupled to the intermediate case and including a rear case having at least one tapping hole formed in corner regions thereof;
   a rotation part that has a tapping hole, is connected to the protruding final reduction gear by inserting the protruding final reduction gear into an inner space surrounded by a circular guide wall formed on a rear surface of the rotation part, and is rotated at a final reduction ratio;
   a first tapping screw that passes through the tapping hole of the rotation part and is fastened to a rotary shaft of the protruding reduction gear; and
   at least one second tapping screw that passes through one side of the front case and the intermediate case and is fastened to the tapping hole of the rear case,
   wherein the protruding final reduction gear is seated in the inner space surrounded by the guide wall and is engaged with a gear formed in an inner perimeter of the guide wall.

2. The small actuator of claim 1, wherein the reduction gears include:
   a first reduction gear engaged with a gear of the driving motor;
   a second reduction gear engaged with the first reduction gear;
   a third reduction gear engaged with the second reduction gear; and
   a fourth reduction gear engaged with the third reduction gear.

3. The small actuator of claim 2, wherein the first to fourth reduction gears are dual gears in which a driving gear and a driven gear are integrally manufactured.

4. The small actuator of claim 2, wherein a radius of the first reduction gear is equal to or larger than a radius of the driving motor, a radius of the second reduction gear is equal to or larger than the radius of the first reduction gear, a radius of the third reduction gear is equal to or larger than the radius of the second reduction gear, and a radius of the fourth reduction gear is equal to or larger than the radius of the third reduction gear.

5. The small actuator of claim 2, wherein a first reduction ratio between the gear of the driving motor and the first reduction gear is in a range of 2.5 to 3.5, a second reduction ratio between the first reduction gear and the second reduction gear is in a range of 1 to 2, a third reduction ratio between the second reduction gear and the third reduction gear is in a range of 3.5 to 4.5, and a fourth reduction ratio between the third reduction gear and the fourth reduction gear is in a range of 4 to 5.

6. The small actuator of claim 2, wherein a total reduction rate between the gear of the driving motor and the fourth reduction gear is in a range of 50 to 150.

7. The small actuator of claim 1, further comprising a rotary shaft of the protruding final reduction gear passing through a bearing, wherein the bearing is inserted into the through-hole in a rear surface of the front case, and is in close contact between a locking step formed along an inner perimeter of the through-hole and the protruding final reduction gear.

8. A small actuator for a robot, comprising:
   an intermediate case including a driving motor and a plurality of reduction gears that continuously decelerate rotation of the driving motor to increase a torque;
   a front case having a through-hole, wherein a part of a final reduction gear among the reduction gears passes through the through-hole;
   a housing coupled to the intermediate case and including a rear case having at least one tapping hole formed in corner regions thereof;
   a rotation part that has a tapping hole, is connected to the protruding final reduction gear by inserting the protruding final reduction gear into an inner space surrounded by a circular guide wall formed on a rear surface of the rotation part, and is rotated at a final reduction ratio;
   a first tapping screw that passes through the tapping hole of the rotation part and is fastened to a rotary shaft of the protruding reduction gear; and
   at least one second tapping screw that passes through one side of the front case and the intermediate case and is fastened to the tapping hole of the rear case, wherein a fixing protrusion formed on one side of a rotary shaft of the protruding final reduction gear is inserted into a fixing hole extending to one side of the tapping hole of the rotation part.

9. The small actuator of claim 1, wherein the front case and the intermediate case are manufactured of aluminum, and the rear case is manufactured of an engineering plastic.

10. The small actuator of claim 1, wherein a width of the housing is in a range of 15 to 20 mm, a length of the housing is in a range of 20 to 25 mm, and a height of the housing is in a range of 30 to 35 mm.

11. The small actuator of claim 1, wherein a ratio of a longest value to a shortest value among a width, a length, and a height of the housing is in a range of 1.5 to 2.5.

* * * * *